(12) United States Patent
Nasman et al.

(10) Patent No.: US 11,371,441 B2
(45) Date of Patent: Jun. 28, 2022

(54) TRANSLATING FLUID DELIVERY DEVICE

(71) Applicant: Raytheon Technologies Corporation, Farmington, CT (US)

(72) Inventors: Benjamin Nasman, Tolland, CT (US); Michael M. Davis, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 25 days.

(21) Appl. No.: 16/859,296

(22) Filed: Apr. 27, 2020

(65) Prior Publication Data

US 2020/0386168 A1 Dec. 10, 2020

Related U.S. Application Data

(63) Continuation-in-part of application No. 16/434,532, filed on Jun. 7, 2019, now Pat. No. 11,125,333.

(51) Int. Cl.

| F02C 9/16 | (2006.01) |
|---|---|
| F02C 7/22 | (2006.01) |
| F02C 9/26 | (2006.01) |
| F02C 9/50 | (2006.01) |
| F02C 7/12 | (2006.01) |
| F02C 3/04 | (2006.01) |

(52) U.S. Cl.
CPC .............. *F02C 9/16* (2013.01); *F02C 3/04* (2013.01); *F02C 7/12* (2013.01); *F02C 7/222* (2013.01); *F02C 9/26* (2013.01); *F02C 9/50* (2013.01); *F05D 2220/32* (2013.01); *F05D 2260/213* (2013.01); *F05D 2260/98* (2013.01)

(58) Field of Classification Search
CPC ...... F02C 9/00; F02C 9/16; F02C 9/20; F02C 9/26; F02C 9/263; F02C 9/266; F02C 9/50; F02C 9/52; F02C 9/54; F02C 3/00; F02C 3/04; F02C 7/00; F02C 7/12; F02C 7/14; F02C 7/185; F05D 2220/00; F05D 2220/32; F05D 2220/321; F05D 2220/3212; F05D 2220/3213; F05D 2220/3215–3218; F05D 2260/213; F05D 2260/98
USPC ........................................................ 277/579
See application file for complete search history.

(56) References Cited

U.S. PATENT DOCUMENTS 3,698,725 A 10/1972 Klabunde
3,964,753 A 6/1976 Junker
(Continued)

FOREIGN PATENT DOCUMENTS

CN 108644019 A 10/2018

*Primary Examiner* — Nathan Cumar
(74) *Attorney, Agent, or Firm* — Getz Balich LLC

(57) ABSTRACT

A fluid delivery device is provided that includes a sleeve and a tube. The sleeve extends axially along an axis between a sleeve first end and a sleeve second end. The sleeve extends radially from a sleeve inner side to a sleeve outer side. The sleeve extends circumferentially around the axis thereby forming an internal bore at least partially formed by a bore surface at the sleeve inner side. The internal bore extends axially along the axis through sleeve between the sleeve first end and the sleeve second end. The tube is connected to the sleeve and projects out from the sleeve outer side to a tube distal end. The tube is configured with a delivery device fluid passage fluidly coupled with the internal bore. The delivery device fluid passage extends radially through the tube to a fluid passage outlet at the tube distal end.

20 Claims, 13 Drawing Sheets

(56) References Cited

U.S. PATENT DOCUMENTS

| | | | |
|---|---|---|---|
| 4,406,459 A | | 9/1983 | Davis |
| 4,523,764 A | | 6/1985 | Albers |
| 4,905,637 A | | 3/1990 | Ott |
| 5,639,096 A | * | 6/1997 | Ullah .................... F16J 15/3404 |
| | | | 277/401 |
| 5,658,127 A | * | 8/1997 | Bond .................... F01D 25/183 |
| | | | 277/399 |
| 5,813,674 A | | 9/1998 | Dickie |
| 6,655,693 B2 | | 12/2003 | Hosanna |
| 6,758,598 B2 | | 7/2004 | Beauvais |
| 7,265,467 B2 | | 9/2007 | Sumi |
| 7,410,341 B2 | * | 8/2008 | Gockel ................ F01D 25/125 |
| | | | 415/110 |
| 7,998,238 B2 | | 8/2011 | Takayama |
| 8,845,282 B2 | | 9/2014 | Lapierre |
| 8,920,034 B2 | | 12/2014 | Galivel |
| 8,944,691 B2 | * | 2/2015 | Chumokhvalov .. F16C 33/6659 |
| | | | 384/473 |
| 10,288,163 B2 | | 5/2019 | Miller |
| 11,187,093 B2 | | 11/2021 | Trivedi |
| 2004/0154578 A1 | | 8/2004 | Weaver |

* cited by examiner

TRANSLATING FLUID DELIVERY DEVICE

CROSS-REFERENCE TO RELATED APPLICATIONS

This application claims priority to and is a continuation-in-part of U.S. patent application Ser. No. 16/434,532 filed Jun. 7, 2019, which is hereby incorporated herein by reference in its entirety.

BACKGROUND OF THE DISCLOSURE

1. Technical Field

This disclosure relates generally to a gas turbine engine and, more particularly, to fluid delivery to and/or cooling of a gas turbine engine component.

2. Background Information

A typical gas turbine engine includes seal assemblies to seal gaps between stationary and rotating components. One such known seal assembly includes a stationary carbon seal element that contacts a rotating seal land. Rubbing friction between the stationary carbon seal element and the rotating seal land subjects both the stationary carbon seal element and the rotating seal land to relatively high temperatures and, thus, thermal stresses and fatigue. Various techniques are known in the art for cooling such a seal assembly. While these known cooling techniques have various advantages, there is still room in the art for improvement.

SUMMARY OF THE DISCLOSURE

According to an aspect of the present disclosure, an assembly is provided for a gas turbine engine. This assembly includes a pin, a seal support assembly and a seal element. The pin is configured with a pin fluid passage. The seal support assembly is mated with and slidable along the pin. The seal element is mounted to the seal support assembly. The seal element is configured with a seal element fluid passage that is fluidly coupled with the pin fluid passage through the seal support assembly.

According to another aspect of the present disclosure, another assembly is provided for a gas turbine engine. This assembly includes a guide rail, a seal carrier, a seal element and a fluid coupling. The guide rail is configured with a rail fluid passage. The seal carrier is mated with and axially slidable along the guide rail. The seal carrier is configured with a carrier fluid passage. The seal element is mounted to the seal carrier. The seal element is configured with a seal element fluid passage adapted to receive fluid from the carrier fluid passage. The fluid coupling device is mounted to and axially slidable along the guide rail. The fluid coupling device is configured with a device fluid passage adapted to direct the fluid from the rail fluid passage to the carrier fluid passage.

According to another aspect of the present disclosure, another assembly is provided for a gas turbine engine. This assembly includes a guide rail, a translating device and a fluid coupling device. The guide rail is configured with a rail fluid passage. The translating device is mated with and axially translatable along the guide rail. The translating device is configured with a translating device fluid passage. The fluid coupling device is mounted to and axially slidable along the guide rail. The fluid coupling device is configured with a coupling device fluid passage adapted to direct fluid from the rail fluid passage to the translating device fluid passage. The fluid coupling is adapted to move radially relative to the translating device.

According to another aspect of the present disclosure, a fluid delivery device is provided that includes a sleeve and a tube. The sleeve extends axially along an axis between a sleeve first end and a sleeve second end. The sleeve extends radially from a sleeve inner side to a sleeve outer side. The sleeve extends circumferentially around the axis thereby forming an internal bore at least partially formed by a bore surface at the sleeve inner side. The internal bore extends axially along the axis through sleeve between the sleeve first end and the sleeve second end. The tube is connected to the sleeve and projects out from the sleeve outer side to a tube distal end. The tube is configured with a delivery device fluid passage fluidly coupled with the internal bore. The delivery device fluid passage extends radially through the tube to a fluid passage outlet at the tube distal end.

According to another aspect of the present disclosure, an assembly is provided for rotational equipment. This assembly includes a guide rail and a fluid delivery device. The guide rail includes a guide rail fluid passage. The fluid delivery device includes a sleeve and a tube. The sleeve is translatable axially along the guide rail where the guide rail projects axially through an internal bore of the sleeve. The tube is connected to the sleeve and projects out from an outer side of the sleeve to a tube distal end. The tube is configured with a delivery device fluid passage fluidly coupled with the guide rail fluid passage. The delivery device fluid passage extends radially through the sleeve and the tube to a fluid passage outlet at the tube distal end.

According to still another aspect of the present disclosure, another fluid delivery device is provided that includes a tubular body and a tube. The tubular body extends radially from a cylindrical surface at an inner side of the tubular body to an outer side of the tubular body. The cylindrical surface forms a bore within the tubular body. The bore extends axially along an axis through the tubular body. The tubular body includes a slot that extends radially into the tubular body from the cylindrical surface. The tube projects out from the tubular body to a tube distal end. The tube is configured with a delivery device fluid passage fluidly coupled to the bore through the slot. The delivery device fluid passage extends through the tube to a fluid passage outlet at the tube distal end.

A centerline of the delivery device fluid passage may be perpendicular to the axis.

A slot in the sleeve may fluidly couple the internal bore to the delivery device fluid passage.

The slot may extend partially radially into the sleeve from the sleeve inner side to a slot end. The slot may extend laterally within the sleeve between opposing slot lateral sides. The slot may extend axially within the sleeve between opposing slot axial sides.

A lateral width of the slot extending between the opposing slot lateral sides may be less than an axial length of the slot extending between the opposing slot axial sides.

A radial depth of the slot extending between the sleeve inner side and the slot end may be less than one-third a radial thickness of the sleeve extending between the sleeve inner side and the sleeve outer side.

The slot may extend circumferentially around the axis.

An interface between the tube and the sleeve may be located an axial first distance from the sleeve first end. The interface between the tube and the sleeve may be located an axial second distance from the sleeve second end. The axial first distance may be different than the axial second distance.

The tube may be configured with a flared portion at the tube distal end.

The tube may be configured with a groove in the flared portion. The groove may extend within the flared portion around a centerline of the delivery device fluid passage.

A ring seal element may be included and seated within the groove.

The tube may be configured as or otherwise include a nozzle. The fluid passage outlet may be configured as or otherwise include a nozzle outlet.

At least the sleeve and the tube may be configured together as a monolithic body.

The monolithic body may be configured from or otherwise include metal.

The guide rail fluid passage may include a guide rail bore and a guide rail aperture fluidly coupled with the guide rail bore. The guide rail bore may extend partially axially along an axis into the guide rail. The guide rail aperture may extend radially into the guide rail to the guide rail bore. The delivery device fluid passage may be fluidly coupled to the guide rail bore through the guide rail aperture.

The delivery device fluid passage may include a tube bore and a slot. The tube bore may extend radially from the slot to the fluid passage outlet. The slot may extend radially into an inner side of the sleeve. The slot may fluidly couple the guide rail fluid passage to the tube bore.

An inner side of the sleeve may radially engage and may be axially slidable along an outer side of the guide rail.

A component may be included, which component may include a receptacle configured to receive the tube at the tube distal end. The component may be mated with and configured to translate axially along the guide rail.

A component may be included. The tube may include a nozzle configured to direct fluid from the fluid passage outlet to impinge against the component.

The guide rail may be configured as or otherwise include a guide pin.

The assembly may include a seal element mounted to the translating device. The translating device may be configured as a seal carrier.

The seal element may be configured with a seal element fluid passage adapted to receive the fluid from the translating device fluid passage.

The assembly may include a seal land sealingly engaged with the seal element.

The assembly may include a spring element engaged with the seal support assembly and configured to bias the seal element against the seal land.

The seal element may be configured as or otherwise include an annular carbon seal element.

The seal element may extend circumferentially around a centerline. An inlet portion of the seal element fluid passage may extend axially along the centerline into the seal element. An outlet portion of the seal element fluid passage may extend radially, relative to the centerline, into the seal element.

The assembly may include a plurality of pins that include the pin. The plurality of pins may be arranged in an array about a centerline of the gas turbine engine. The seal support may be mated with and slidable along each of the plurality of pins. The seal element may extend circumferentially around the centerline.

The seal support assembly may include a seal carrier and a fluid coupling device. The seal carrier may be mated with and slidable along the pin. The seal carrier may be configured with a carrier fluid passage that is fluidly coupled with the seal element fluid passage. The fluid coupling device may be mounted to and slidable along the pin. The fluid coupling device may be configured with a device fluid passage that fluidly couples the pin fluid passage with the carrier fluid passage.

The fluid coupling device may be configured to move relative to the seal carrier.

The fluid coupling device may include a sleeve and a tube. The sleeve may be mounted to and slidable along the pin. The tube may project out from the sleeve and into a receptacle of the seal carrier.

The device passage may include a device slot and a device aperture. The device slot may be formed in the sleeve and abut the pin. The device aperture may project out from the device slot and extend through the sleeve and the tube.

The pin fluid passage may include a pin bore and a pin aperture that projects out from the pin bore and extends through a sidewall of the pin. An outlet of the pin aperture may interface with the device slot.

The assembly may include a ring seal arranged between the tube and the seal carrier.

The carrier fluid passage may include an annular slot that interfaces with an inlet of the seal element fluid passage.

The seal carrier may include a flange. The pin may project through a channel that extends radially into the flange.

The assembly may include a static structure of the gas turbine engine. The pin may be mounted to the static structure.

An inner side of the sleeve may radially engage and may be axially slidable along an outer side of the guide rail at a tight tolerance clearance fit between the sleeve and the guide rail.

One or more seal elements may be included. Each seal element may be sealingly engaged with and between the sleeve and the guide rail.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
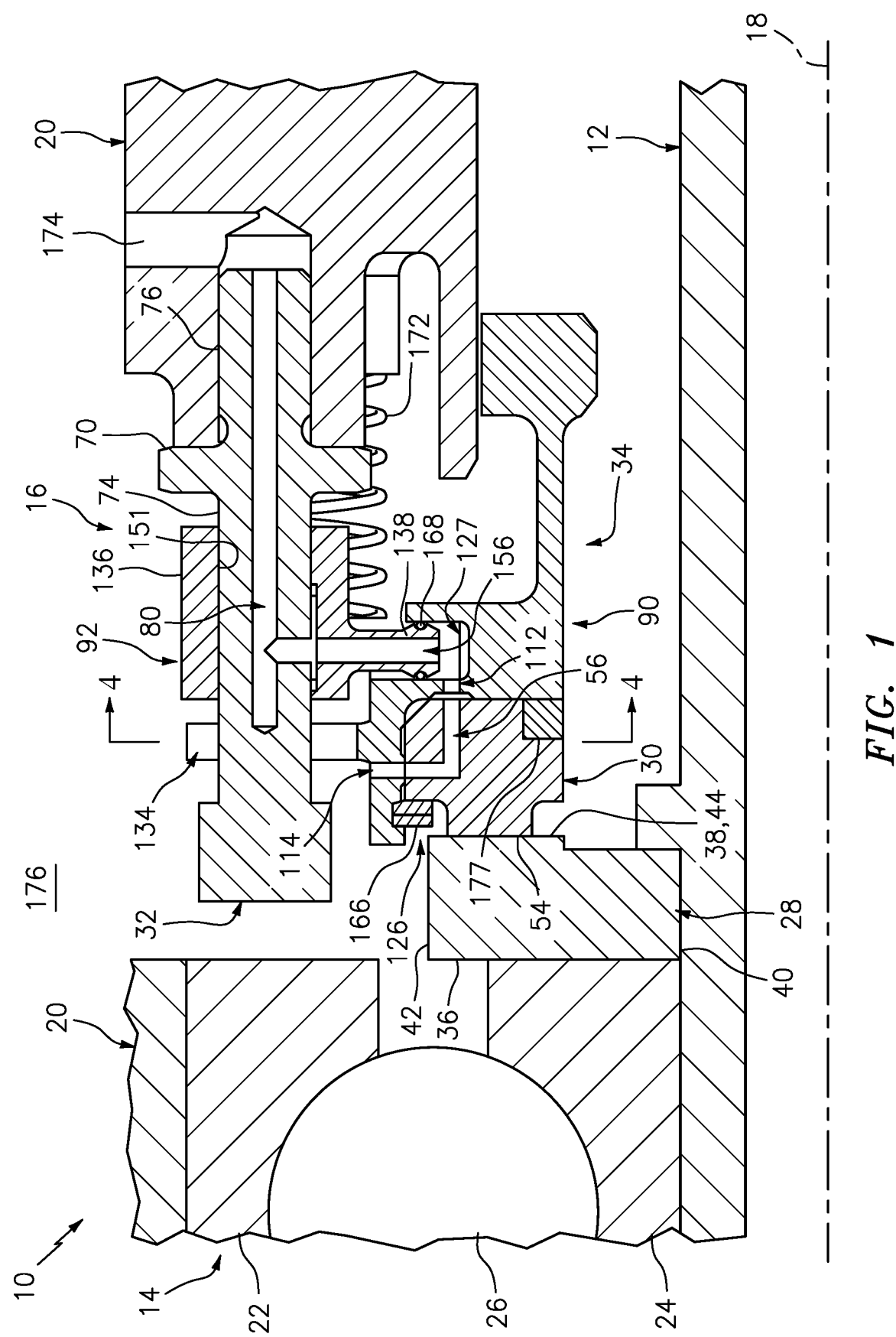
FIG. 1 is a partial side sectional illustration of an assembly for rotational equipment such as a gas turbine engine.

FIG. 1 is a partial side sectional illustration of an assembly 10 for a piece of rotational equipment. The piece of rotational equipment may be configured as a gas turbine engine for an aircraft propulsion system such as, but not limited to, a geared or direct-drive turbofan gas turbine engine. However, the assembly 10 of the present disclosure is not limited to such an aircraft application nor a gas turbine engine application. The assembly 10, for example, may alternatively be configured with rotational equipment such as an industrial gas turbine engine, a wind turbine, a water turbine or any other apparatus which includes (A) a seal assembly for sealing a gap between a rotating component and a static/fixed component and/or (B) a nozzle for delivering fluid to another component. Referring again FIG. 1, the assembly 10 includes a rotating element 12, a bearing 14 and a seal assembly 16.

The rotating element 12 is rotatable about an axial centerline 18, which centerline 18 may be an axial centerline and/or a rotational axis of the gas turbine engine. The rotating element 12 of FIG. 1 is configured as a tubular engine shaft. However, in other embodiments, the rotating element 12 may be configured as another component (e.g., a sleeve) mounted to and rotatable with an engine shaft, or any other rotor within the rotational equipment.

The bearing 14 is configured to rotatably support the rotating element 12 relative to a static structure 20; e.g., an engine case, a strut assembly, etc. The bearing 14 may be configured as a roller element bearing. The bearing 14 of FIG. 1, for example, includes an annular outer race 22, an annular inner race 24 and a plurality of bearing elements 26; e.g., cylindrical or spherical elements. The outer race 22 circumscribes the inner race 24 and the bearing elements 26. The outer race 22 is mounted to the static structure 20. The inner race 24 circumscribes and is mounted to the rotating element 12. The bearing elements 26 are arranged in an annular array about the axial centerline 18, which array is radially between and engaged with the outer race 22 and the inner race 24. The present disclosure, of course, is not limited to the foregoing exemplary bearing configuration. For example, in other embodiments, the bearing may be configured as a journal bearing or any other type of bearing utilized in the gas turbine engine.

The seal assembly 16 is configured to seal an annular gap between a rotating assembly and the static structure 20, which rotating assembly includes at least the rotating element 12. The seal assembly 16 of FIG. 1, for example, is configured to seal the gap which extends (e.g., radially and/or axially) between the static structure 20 and the rotating element 12. Of course, in other embodiments, the seal assembly 16 may seal a gap extending between the static structure 20 and another rotating component mounted to and/or rotatable with the rotating element 12.

The seal assembly 16 of FIG. 1 includes an annular seal land 28 and an annular seal element 30; e.g., a carbon seal element. The seal assembly 16 of FIG. 1 also includes one or more guide rails 32 and a seal support assembly 34.

The seal land 28 is configured with a full hoop body that extends circumferentially about the axial centerline 18. The seal land 28 extends axially along the axial centerline 18 between an axial first end 36 and an axial second end 38. The seal land 28 extends radially between a radial inner side 40 and a radial outer side 42.

The seal land 28 includes an annular, radially extending seal land surface 44 located at (e.g., on, adjacent or proximate) the axial second end 38. This seal land surface 44 may be an uninterrupted surface. The seal land surface 44, for example, may be a flat planar surface configured without circumferential and/or radial interruptions such as, but not limited to, channels, slots and apertures. Of course, in other embodiments, the seal land surface 44 may be circumferentially and/or radially interrupted by one or more channels, slots, apertures and/or other types of surface interruptions.

Figure 2:
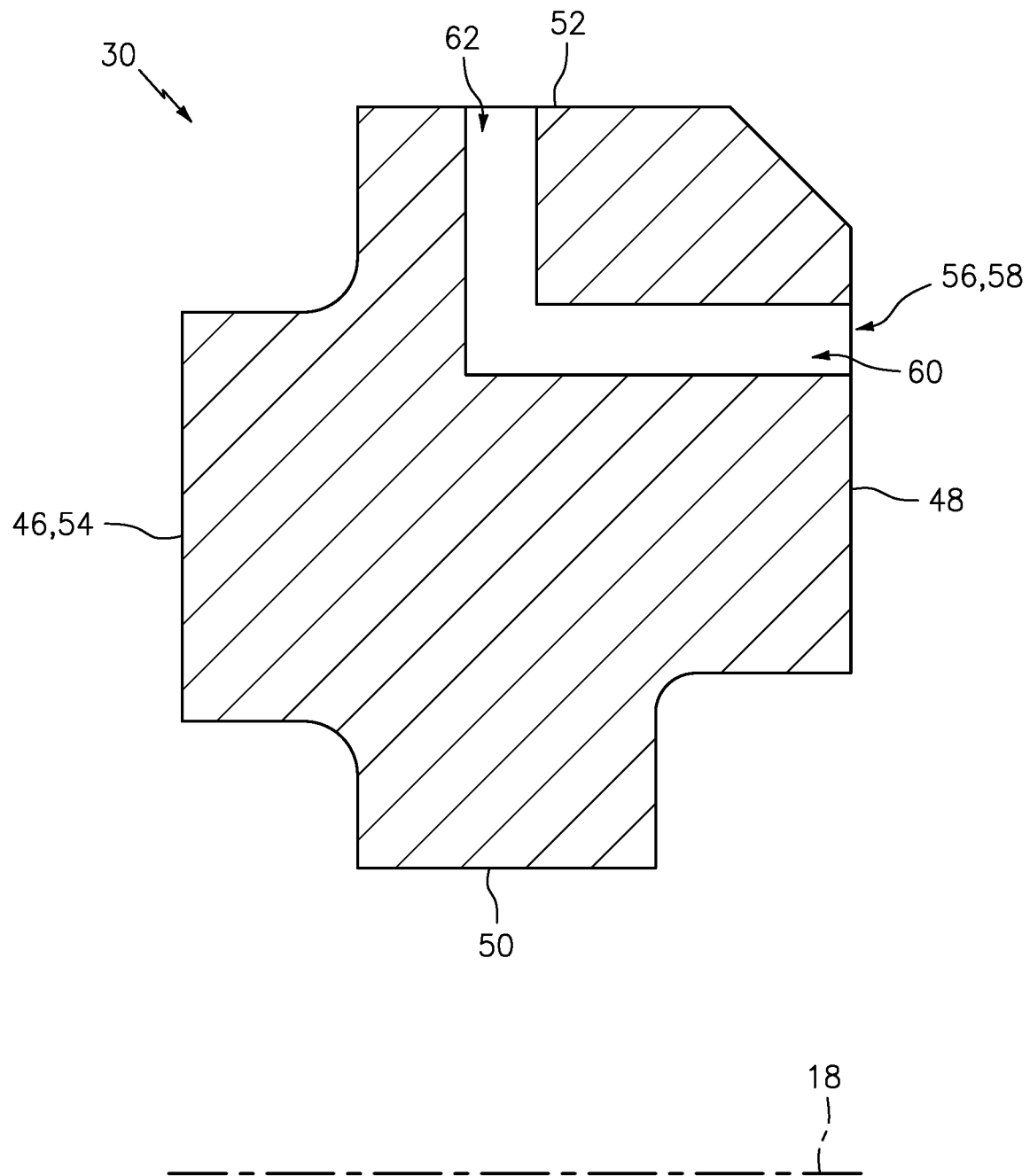
FIG. 2 is a partial side sectional illustration of a seal element.

Referring to FIG. 2, the annular seal element 30 is configured with a full hoop body that extends circumferentially about the axial centerline 18. This full hoop body may be a single unitary body; e.g., a monolithic body. Alternatively, the full hoop body may be a segmented body; e.g., the seal element 30 may be configured from an array of arcuate seal element segments. The seal element 30 extends axially along the axial centerline 18 between an axial first end 46 and an axial second end 48. The seal element 30 extends radially between a radial inner side 50 and a radial outer side 52.

The seal element 30 includes an annular, radially extending seal element surface 54 located at (e.g., on, adjacent or proximate) the axial first end 46. This seal element surface 54 may be an uninterrupted surface. The seal element surface 54, for example, may be a flat planar surface configured without circumferential and/or radial interruptions such as, but not limited to, channels, slots and apertures. Of course, in other embodiments, the seal element surface 54 may be circumferentially and/or radially interrupted by one or more channels, slots, apertures and/or other types of surface interruptions.

Figure 3:
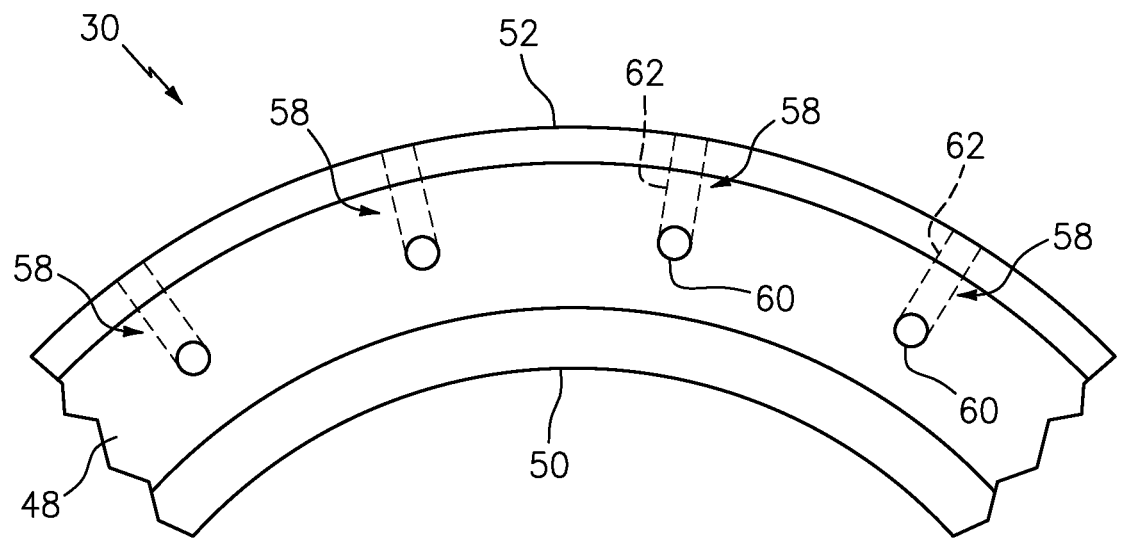
FIG. 3 is a partial end view illustration of the seal element.
Figure 3:
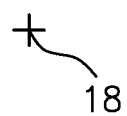

The seal element 30 is configured with an internal seal element fluid passage 56. This fluid passage 56 includes/is formed by one or more passageways 58 through the seal element 30; see also FIG. 3. These passageways 58 may be located circumferentially about the axial centerline 18 in an annular array as shown in FIG. 3. Referring again to FIG. 2, each passageway 58 includes/is formed by an inlet portion 60 and an outlet portion 62 connected to the inlet portion 60 at a corner; e.g., an elbow. The inlet portion 60 is an aperture (e.g., a hole, groove, or some other form of passageway) that may extend axially along the axial centerline 18 partially into the seal element 30 from the axial second end 48 to the outlet portion 62. The outlet portion 62 is an aperture (e.g., a hole, groove, or some other form of passageway) that may extend radially, relative to the axial centerline 18, partially into the seal element 30 from the radial outer side 52 to the inlet portion 60.

Figure 4:
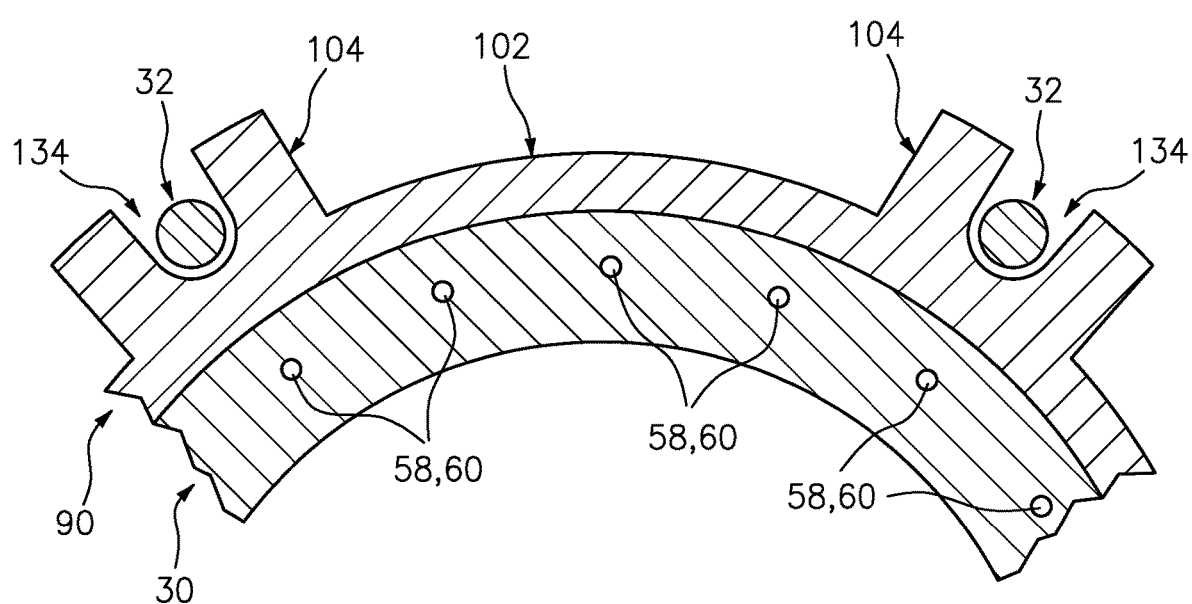
FIG. 4 is a cross-sectional illustration of a portion of the assembly of FIG. 1 along line 4-4.
Figure 4:
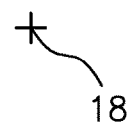
Figure 5:
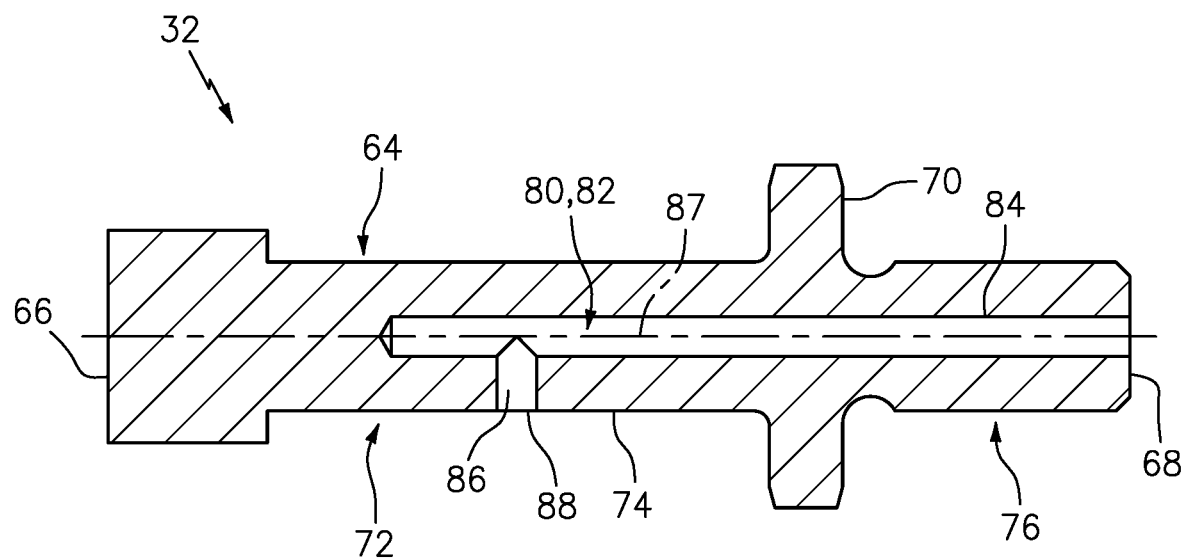
FIG. 5 is a side sectional illustration of a guide rail pin.

Referring to FIG. 4, the guide rails 32 are arranged circumferentially about the axial centerline 18 in an annular array. Referring to FIG. 5, each of the guide rails 32 may be configured as or otherwise include a guide pin. For example, each guide rail 32 of FIG. 5 may have, but is not limited to, a generally cylindrical body 64 that extends axially between an axial first end 66 and an axial second end 68. A generally annular flange 70 may project out from and circumscribes body 64. This flange 70 may be configured with a polygonal (e.g., hexagonal) peripheral cross-sectional geometry adapted for mating with an installation tool such as, but not limited to, a wrench or a socket. An axial first portion 72 of the body 64, axially between the axial first end 66 and the flange 70, may be configured with a smooth cylindrical surface 74. An axial second portion 76 of the body 64, axially between the axial second end 68 and the flange 70, may be configured with threads; e.g., the portion 76 is a threaded portion.

At least one of the guide rails 32 is configured with an internal guide rail fluid passage 80; e.g., a pin fluid passage. This fluid passage 80 includes/is formed by a (e.g., single) passageway 82 through the guide rail 32. The passageway 82 includes/is formed by a guide rail bore 84 and a guide rail aperture 86 (e.g., a hole). The guide rail bore 84 extends axially along an axis 87 partially into the guide rail 32 from the axial second end 68. The guide rail aperture 86 projects out from and is thereby fluidly coupled with the guide rail bore 84. The guide rail aperture 86 extends radially through a sidewall of the guide rail 32 to an outlet 88 in the cylindrical surface 74. Note, in some embodiments, the guide rail 32 may be configured with more than one guide rail aperture 86.

Referring to FIG. 1, the seal support assembly 34 is configured to translate axially along the guide rails 32. The seal support assembly 34 is also configured to support and provide fluid to the seal element 30. The seal support assembly 34 of FIG. 1 includes a seal carrier 90 and at least one fluid delivery device 92 (e.g., a fluid coupling device).

Figure 6:
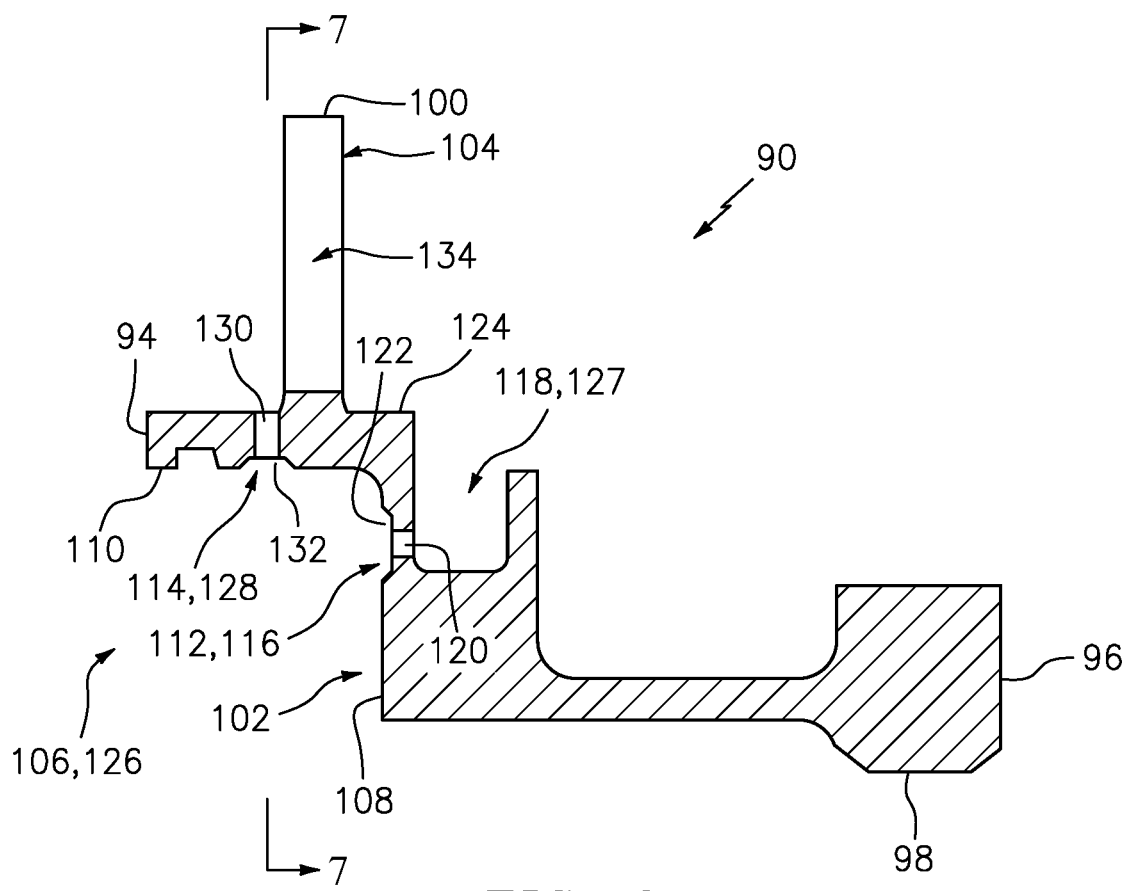
FIG. 6 is a partial side sectional illustration of a seal carrier.
Figure 7:
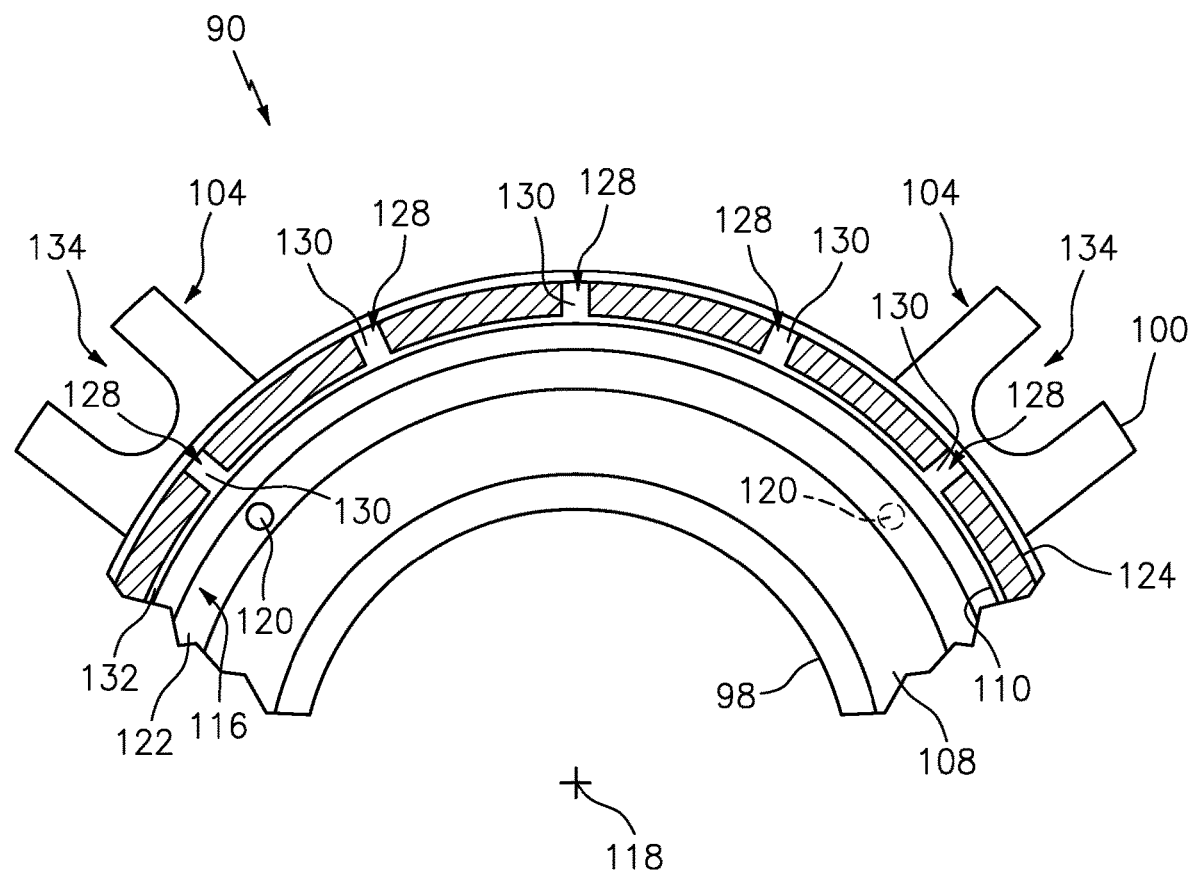
FIG. 7 is a cross-sectional illustration of a portion of the seal carrier of FIG. 6 along line 7-7.

Referring to FIG. 6, the seal carrier 90 is configured with a full hoop body that extends circumferentially about the axial centerline 18; see also FIG. 7. The seal carrier 90 extends axially along the axial centerline 18 between an axial first end 94 and an axial second end 96. The seal carrier 90 extends radially, relative to the axial centerline 18, between a radial inner side 98 and a radial outer side 100.

The seal carrier 90 of FIG. 6 includes a tubular base 102 and one or more flanges 104; see also FIGS. 4 and 7. The base 102 is configured with an annular recess/notch 106. This recess 106 extends axially partially into the base 102 from the axial first end 94 to an (e.g., annular) axial end surface 108. The recess 106 extends radially partially into the base 102 from the radial inner side 98 to a (e.g., tubular) radial end surface 110. The recess 106 forms a receptacle 126 for the seal element 30 as described below in further detail.

The base 102 is configured with one or more seal carrier fluid passages 112 and 114. The first carrier fluid passage 112 includes/is formed by at least one passageway 116 through the base 102. This passageway 116 includes/is formed by at least one first aperture 118 (e.g., a hole), at least one second aperture 120 (e.g., a hole) and a slot 122. The first aperture 118 extends radially partially into the base 102 from an outer surface 124 of the base 102. This first aperture 118 is configured to form a receptacle 127 for the fluid delivery device 92 as described below in further detail. The second aperture 120 extends axially within the base 102 between the first aperture 118 and the slot 122. The second aperture 120 thereby fluidly couples the first aperture 118 to the slot 122. The slot 122 is located in the axial end surface 108. This slot 122 may be an annular slot (e.g., see FIG. 7), which extends circumferentially around the centerline 18.

The second carrier fluid passage 114 includes/is formed by one or more passageways 128 through the base 102. These passageways 128 may be located circumferentially about the axial centerline 18 in an annular array as shown in FIG. 7. Referring again to FIG. 6, each passageway 128 includes/is formed by an aperture 130 (e.g., a hole) and a slot 132. The slot 132 may be shared by all of the passageways 128; e.g., each passageway 128 includes a circumferential portion of the slot 132. The slot 132 is located in the radial end surface 110. This slot 132 may be an annular slot, which extends circumferentially around the centerline 18. The aperture 130 extends radially into the base 102 to the slot 132 from the outer surface 124 and thereby is fluidly coupled with the slot 132.

Referring to FIG. 7, the flanges 104 are arranged circumferentially about the base 102. Each flange 104 includes a slot 134.

Figure 8:
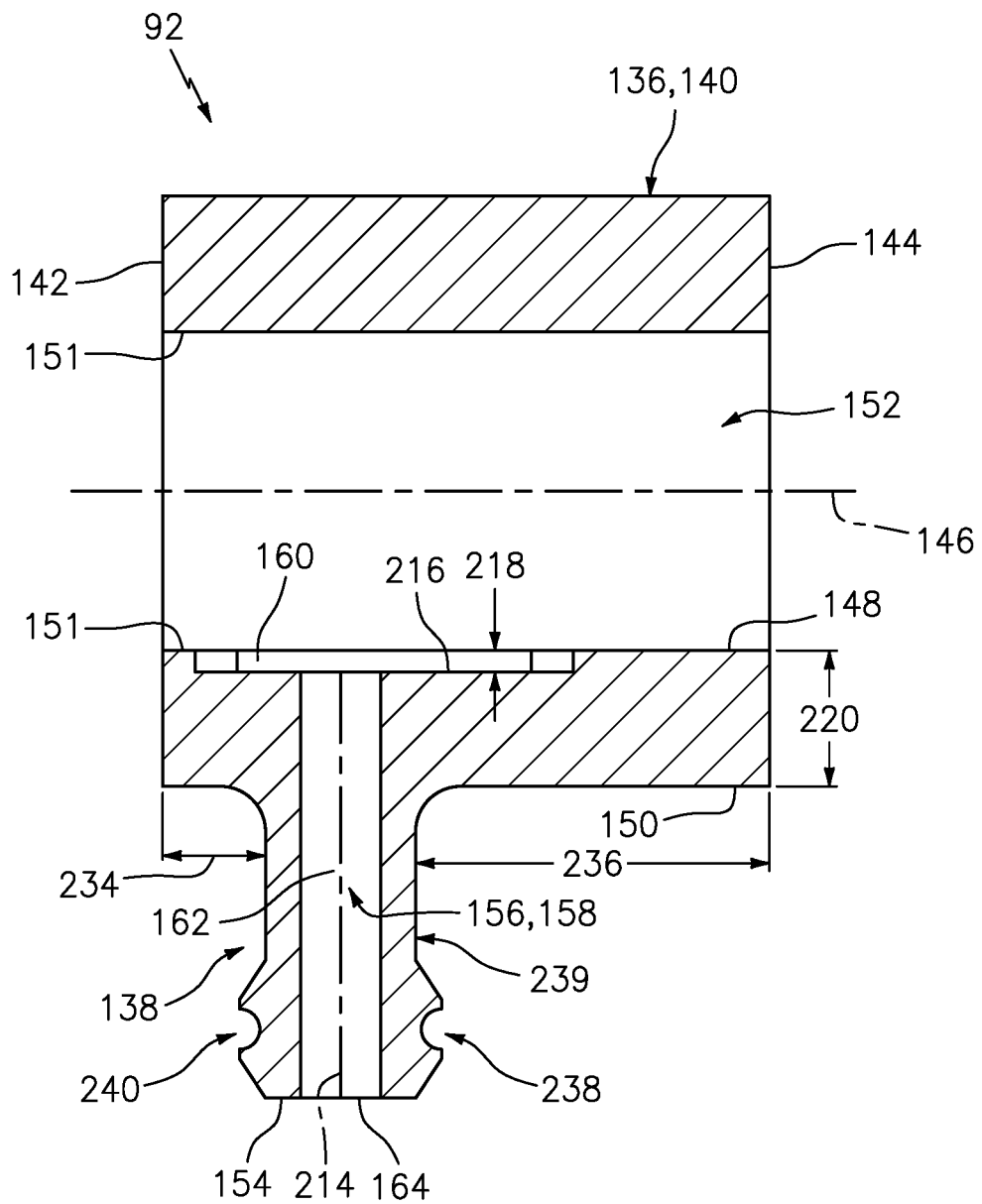
FIG. 8 is a side sectional illustration of a fluid delivery device.

Referring to FIG. 8, the fluid delivery device 92 includes a sleeve 136 (e.g., a linear hydrostatic bearing) and a tube 138 (e.g., a jumper tube). The sleeve 136 is configured as a sleeve tubular body 140. The tubular body 140 extends axially between an axial first end 142 of the fluid delivery device 92 and its sleeve 136 and an axial second end 144 of the fluid delivery device 92 and its sleeve 136. The tubular body 140 extends radially, relative to an axis 146 of the sleeve 136, between a radial inner side 148 and a radial outer side 150, where the axis 146 may be parallel to the centerline 18 and/or coaxial with the axis 87 (see FIG. 5) when the device 92 is mated with the respective rail 32. A bore surface 151 (e.g., a cylindrical surface) of the sleeve 136 at the radial inner side 148 of the sleeve 136 forms an internal bore 152. This bore 152 extends axially along the axis 146 through the fluid delivery device 92 and its sleeve 136 from the first end 142 to the second end 144.

The tube 138 may be configured as a tubular projection. The tube 138 projects radially, relative to the axis 146 of the sleeve 136, out from the radial outer side 150 of the sleeve 136 to a distal end 154.

The fluid delivery device 92 is configured with at least one coupling device fluid passage 156. This fluid passage 156 includes/is formed by a (e.g., single) passageway 158 through the fluid delivery device 92. This passageway 158 includes/is formed by a slot 160 and an aperture 162 (e.g., a hole, a bore, etc.). The slot 160 is located in the sleeve 136 at its radial inner side 148. The slot 160 extends partially axially within the sleeve 136 and may extend either fully circumferentially or partially circumferentially about the axis 146 of the sleeve 136. The aperture 162 projects out from the slot 160 and extends through the sleeve 136 and the tube 138 to an outlet 164 at the distal end 154. In this embodiment, an outer portion of the aperture 162 forms a bore of the tube 138.

Referring to FIG. 1, the seal land 28 is arranged with the rotating element 12 in such a manner so as to be rotatable with the rotating element 12 about the axial centerline 18. The seal land 28 of FIG. 1, for example, circumscribes and is fixedly mounted to the rotating element 12.

The guide rails 32 are fixedly mounted to the static structure 20. For example, the threaded portion 76 of each guide rail 32 may be screwed into a corresponding tapped hole in the static structure 20.

The seal element 30 is seated in the receptacle 126 of the seal carrier 90. A split ring 166 and/or another device secures the seal element 30 within the receptacle 126 such that the seal element 30 is fixedly mounted to the seal carrier 90. Of course, the seal element 30 may also or alternatively be mounted to the seal carrier 90 using other fastening and/or bonding techniques. The seal element fluid passage 56 is fluidly coupled with and between the first and the second seal carrier fluid passages 112 and 114. More particularly, a fluid interface is formed between the passage 112 slot and the passage 56 apertures and a fluid interface is formed between the passage 56 apertures and the passage 114 slot.

The tube 138 is seated in the receptacle 127 of the seal carrier 90. More particularly, the tube 138 projects radially, relative to the axial centerline 18, into the receptacle 127 to its distal end 154 (see FIG. 8). The elements 90 and 138 may be configured such that there is a relatively tight fit between those elements 90 and 138 in order to form a seal interface therebetween. An annular ring seal element 168 may also or alternatively be arranged between the tube 138 and the seal carrier 90.

The fluid delivery device 92 is mated with/slidably mounted on a respective one of the guide rails 32—the guide rail 32 with the internal rail fluid passage 80. In particular, the guide rail 32 is inserted through the bore of the sleeve 136 such that a bore surface 151 at the radial inner side of the sleeve 136 engages the cylindrical surface 74 of the guide rail 32. The surfaces 74 and 151 may be configured (e.g., sized) such that there is a relatively tight fit between the elements 32 and 136 in order to form a seal interface therebetween. The coupling fluid passage 156 is fluidly coupled with the guide rail fluid passage 80. More particularly, a fluid interface is formed between the passage 80 aperture and the passage 156 slot.

The seal carrier 90 is mated with the guide rails 32. In particular, each of the guide rails 32 projects through a respective flange slot 134; see also FIG. 4.

One or more spring elements 172 (e.g., coil springs) may be arranged between the static structure 20 and the seal carrier 90. These spring elements 172 are configured to bias the seal carrier 90 and, thus, the seal element 30 away from the static structure 20 and towards the seal land 28. In particular, the spring elements 172 cause the surfaces 44 and 54 to axially sealingly engage (e.g., contact) one another.

During operation of the assembly 10 of FIG. 1, fluid (e.g., lubricant and/or coolant) flows through the fluid passages 174, 80, 156, 112, 56 and 114. In particular, the fluid flows sequentially through the fluid passages 174, 80, 156, 112, 56 and 114 and is discharged into a bearing compartment 176 for collection in a bearing compartment sump. Heat energy may be transferred from the seal element 30 into the fluid as the fluid travels through the seal element fluid passage 56. The flow of the fluid through the seal element 30 may thereby cool the seal element 30 during operation and, thus, mitigate heat related stresses and degradation of the seal element 30 caused by rubbing friction between the elements 28 and 30.

In order to accommodate engine vibrations and differential thermal expansion between the components 90 and 92, the seal carrier 90 and the fluid delivery device 92 are each adapted to move (e.g., translate) axially along the guide rail(s) 32. In addition, the fluid delivery device 92 may also move (e.g., radially) relative to the seal carrier 90 to accommodate radial movements/shifting of the seal carrier 90 relative to the guide rails 32.

The assembly 10 is described above as including a single fluid delivery device 92 for ease of description. However, in other embodiments, the assembly 10 may include one or more additional fluid delivery devices 92 such that a plurality or all of the guide rails 32 is associated with a respective fluid delivery device 92. The number of fluid delivery devices 92 included may be selected based on the cooling requirements of the seal element 30. In such embodiments, the fluid passage 112 includes a plurality of the apertures 120; e.g., see dashed aperture 120 in FIG. 7.

In some embodiments, the assembly 10 may also include one or more secondary seals. For example, the assembly of FIG. 1 includes an annular secondary seal element 177 axially between the seal element 54 and the seal carrier 90. This secondary seal element 177 is configured to separate cooling fluids from boundary fluids.

Figure 9:
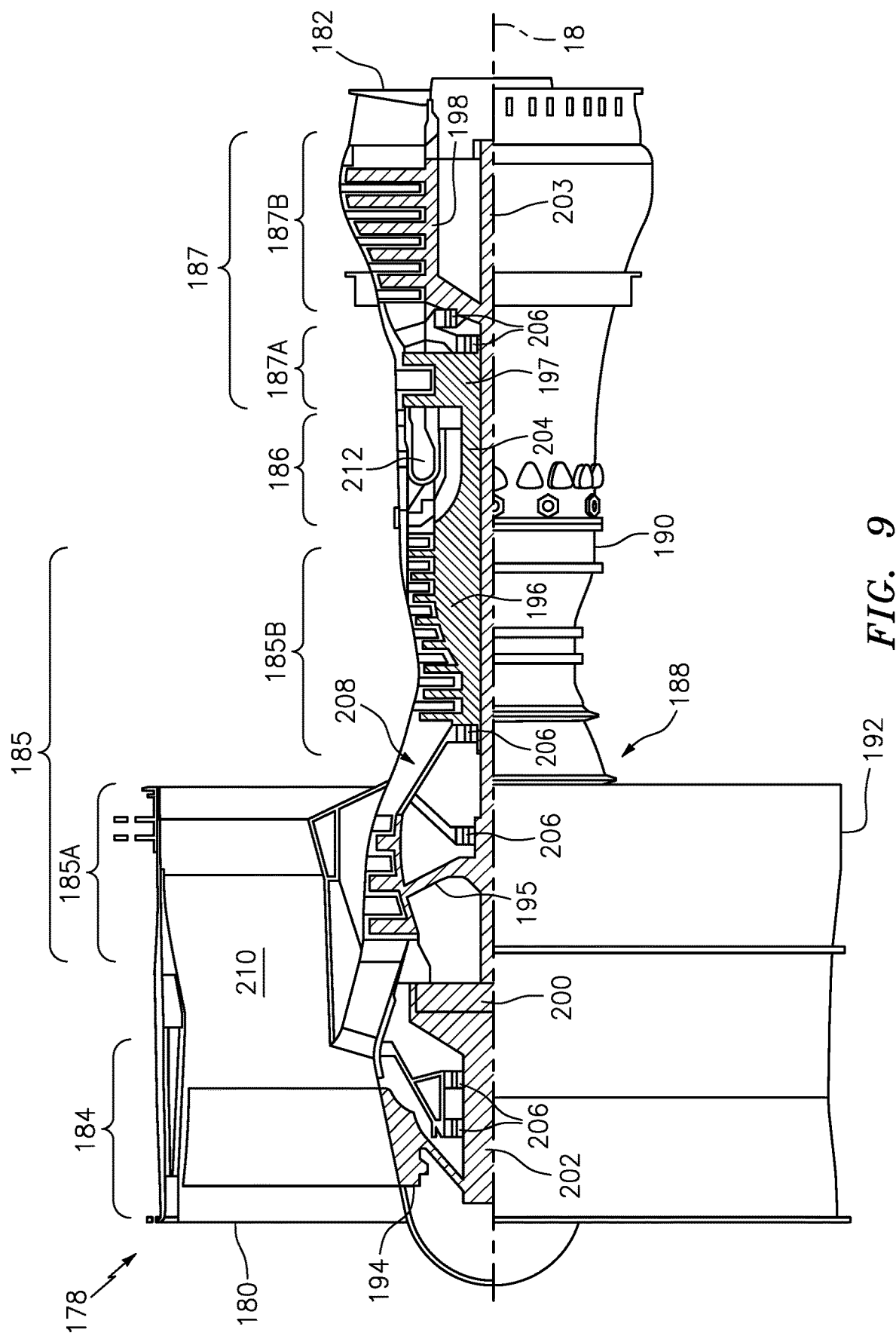
FIG. 9 is a side cutaway illustration of a geared turbine engine with which the assembly of FIG. 1 may be configured.

FIG. 9 is a side cutaway illustration of a geared turbine engine 178 with which the assembly 10 may be configured. The turbine engine 178 extends along an axial centerline (e.g., the centerline 18) between an upstream airflow inlet 180 and a downstream airflow exhaust 182. The turbine engine 178 includes a fan section 184, a compressor section 185, a combustor section 186 and a turbine section 187. The compressor section 185 includes a low pressure compressor (LPC) section 185A and a high pressure compressor (HPC) section 185B. The turbine section 187 includes a high pressure turbine (HPT) section 187A and a low pressure turbine (LPT) section 187B.

The engine sections 184-187 are arranged sequentially along the centerline 18 within an engine housing 188. This housing 188 includes an inner case 190 (e.g., a core case) and an outer case 192 (e.g., a fan case). The inner case 190 may house one or more of the engine sections 185-187; e.g., an engine core. This inner case 190 may include or may be connected to the static structure 20 of FIG. 1. The outer case 192 may house at least the fan section 184.

Each of the engine sections 184, 185A, 185B, 187A and 187B includes a respective rotor 194-198. Each of these rotors 194-198 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 194 is connected to a gear train 200, for example, through a fan shaft 202. The gear train 200 and the LPC rotor 195 are connected to and driven by the LPT rotor 198 through a low speed shaft 203. The HPC rotor 196 is connected to and driven by the HPT rotor 197 through a high speed shaft 204. The shafts 202-204 are rotatably supported by a plurality of bearings 206; e.g., rolling element and/or thrust bearings. Each of these bearings 206 is connected to the engine housing 188 by at least one stationary structure such as, for example, an annular support strut. The rotating element 12 of FIG. 1 may be configured as any one of the shafts 202-204 or a component mounted thereto or otherwise rotatable therewith, and the bearing 14 of FIG. 1 may be configured as any one of the bearings 206.

During operation, air enters the turbine engine 178 through the airflow inlet 180. This air is directed through the fan section 184 and into a core gas path 208 and a bypass gas path 210. The core gas path 208 extends sequentially through the engine sections 185A-187B. The air within the core gas path 208 may be referred to as "core air". The bypass gas path 210 extends through a bypass duct, which bypasses the engine core. The air within the bypass gas path 210 may be referred to as "bypass air".

The core air is compressed by the compressor rotors 195 and 196 and directed into a combustion chamber 212 of a combustor in the combustor section 186. Fuel is injected into the combustion chamber 212 and mixed with the compressed core air to provide a fuel-air mixture. This fuel air mixture is ignited and combustion products thereof flow through and sequentially cause the turbine rotors 197 and 198 to rotate. The rotation of the turbine rotors 197 and 198 respectively drive rotation of the compressor rotors 196 and 195 and, thus, compression of the air received from a core airflow inlet. The rotation of the turbine rotor 198 also drives rotation of the fan rotor 194, which propels bypass air through and out of the bypass gas path 210. The propulsion of the bypass air may account for a majority of thrust generated by the turbine engine 178, e.g., more than seventy-five percent (75%) of engine thrust. The turbine engine 178 of the present disclosure, however, is not limited to the foregoing exemplary thrust ratio.

Referring to FIG. 8, in some embodiments, a centerline 214 of the fluid passage 156 and/or the tube 138 may be arranged perpendicular to the axis 146. However, in other embodiments, the centerline 214 may be angularly offset from the axis 146 by a non-ninety degree angle; e.g., an acute or an obtuse angle.

The slot 160 of FIG. 8 extends partially radially, relative to the axis 146, into the tubular body 140 to a slot end 216. The slot 160 thereby has a (e.g., radial) depth 218 that extends between the inner side 148 and its surface 151 to the slot end 216. This slot depth 218 is less than a (e.g., radial) thickness 220 of a sidewall of the tubular body 140. The slot depth 218, for example, may be size less than one-third (⅓) of the tubular body thickness 220; e.g., the depth 218 may be less than one-quarter (¼) or one-fifth (⅕) of the thickness 220. The present disclosure, however, is not limited to such an exemplary slot depth 218. For example, in other embodiments, the slot depth 218 may be greater than one-third (⅓) of the tubular body thickness 220.

Figure 10A:
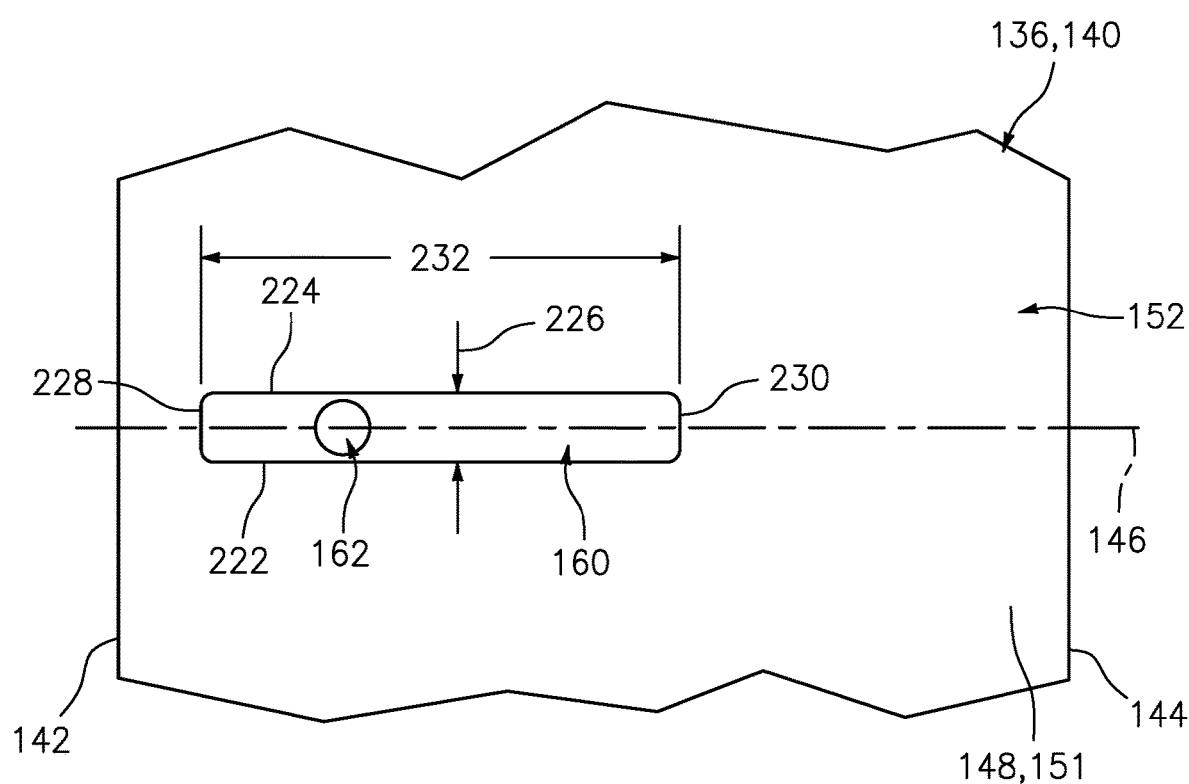
FIG. 10A is a partial internal view of the fluid delivery device.
Figure 10B:
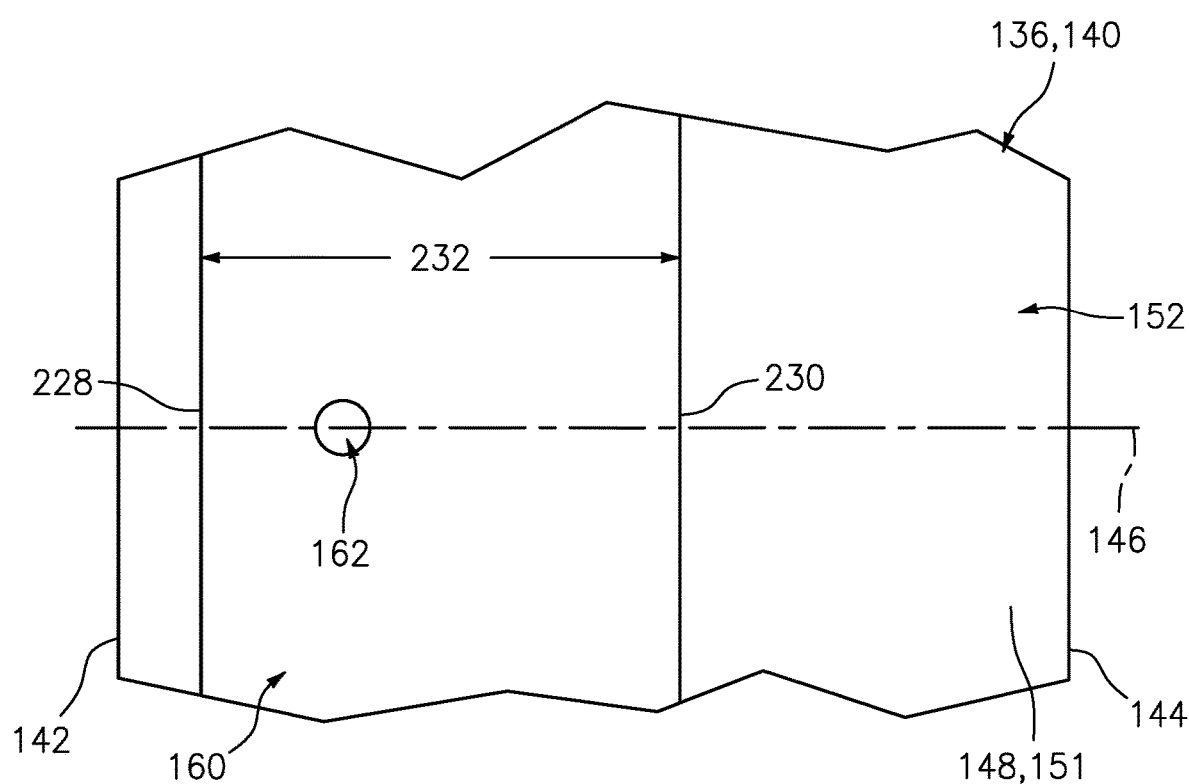
FIG. 10B is a partial internal view of the fluid delivery device with an alternative slot configuration.
Figure 13:
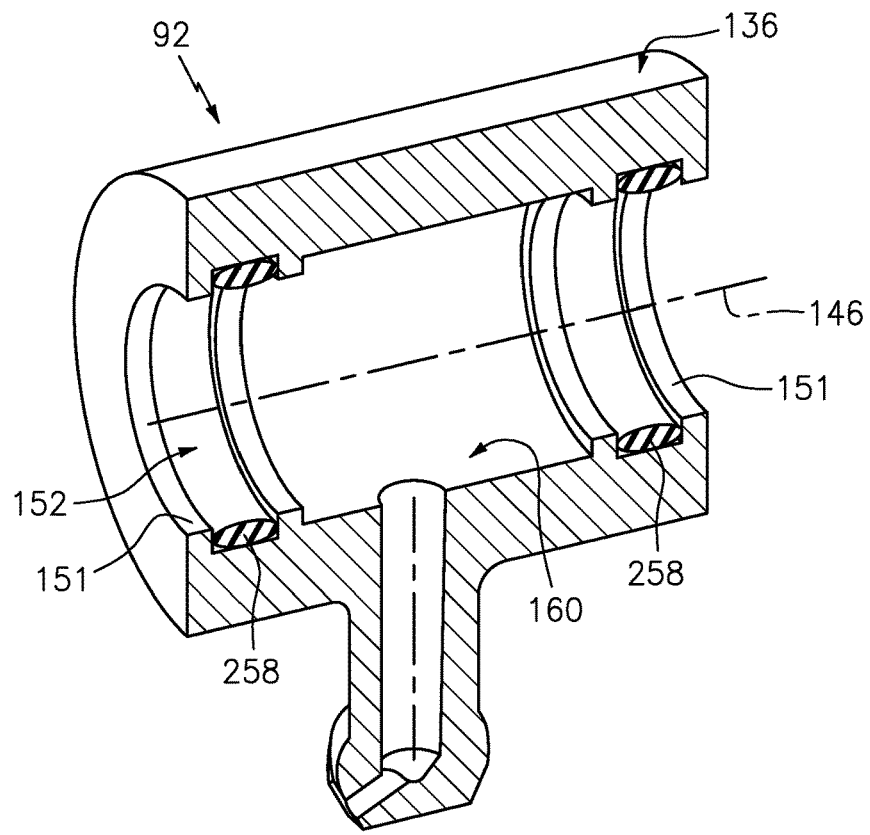
FIG. 13 is a perspective sectional illustration of another fluid delivery device configured with a nozzle.
Figure 14:
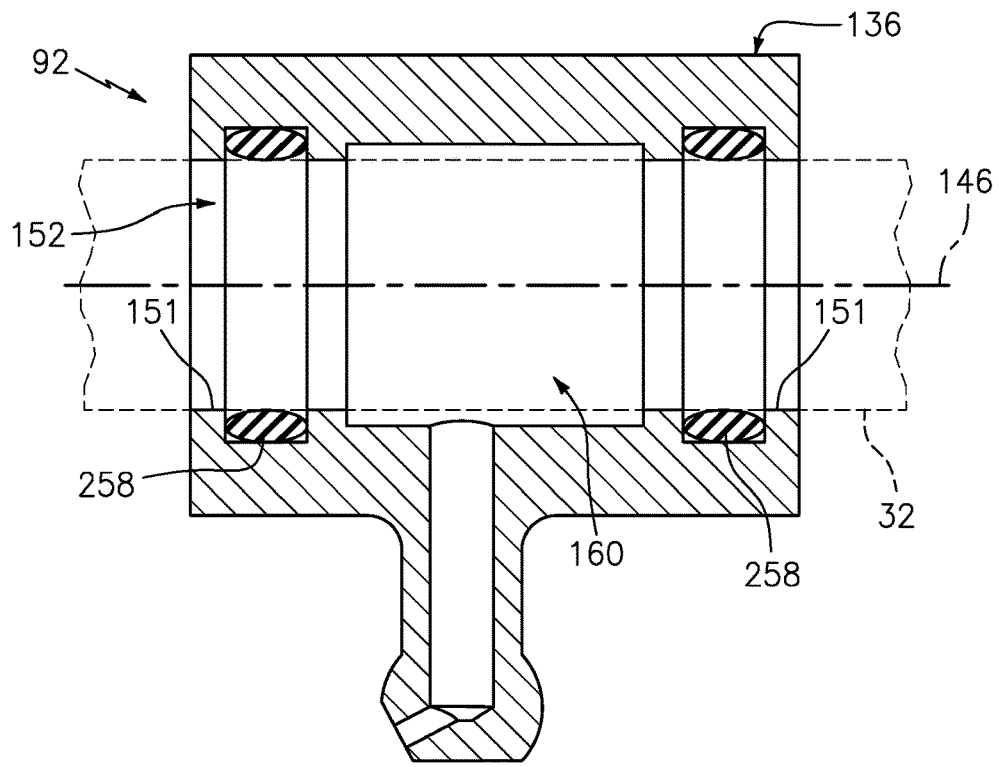
FIG. 14 is a side sectional illustration of the fluid delivery device of FIG. 13 mated with a guide rail shown in dashed line form.

The slot 160 of FIG. 10A extends laterally (e.g., circumferentially or tangentially) within the tubular body 140 between opposing slot lateral sides 222 and 224. The slot 160 thereby has a (e.g., lateral) width 226 that extends between the sides 222 and 224. The slot 160 of FIG. 10 extends axially within the tubular body 140 between opposing slot axial sides 228 and 230. The slot 160 thereby has a (e.g., axial) length 232 that extends between the sides 228 and 230. In some embodiments, the slot width 226 may be less than the slot length 232. The slot width 226, for example, may be less than one-third (⅓) of the slot length 232; e.g., the width 226 may be less than one-quarter (¼) or one-fifth (⅕) or one-sixth (⅙) of the length 232. The present disclosure, however, is not limited to such an exemplary embodiment. For example, in the embodiment of FIG. 10B, the slot 160 may be an annular slot that extends completely circumferentially about the axis 146; see also FIGS. 13 and 14.

Referring to FIG. 8, an interface between the tube 138 and the tubular body 140 is located a (e.g., axial) first distance 234 from the first end 142. The interface between the tube 138 and the tubular body 140 is located a (e.g., axial) second distance 236 from the second end 144. The first distance 234 may be different (e.g., less or greater) than the second distance 236. However, in other embodiments, the first distance 234 may be equal to the second distance 236 such that the tube 138 is (e.g., axially) centered with respect to the sleeve 136 and its tubular body 140. In some embodiments, the tube 138 and the tubular body 140 may be configured together as a monolithic body. In other embodiments, the tube 138 and the tubular body 140 may be discretely formed and subsequently attached to one another, where the interface between these components 138 and 140 may be, for example, a close interference fit and/or sealed by a secondary seal ring.

The tube 138 of FIG. 8 is configured with a flared portion 238 and a second (e.g., non-flared, cylindrical) portion 239. The flared portion 238 is arranged at the tube distal end 154. The flared portion 238 of FIG. 8 includes a (e.g., annular) groove 240 located at, for example, an apex of the flared portion 238. This groove 240 extends within the flared portion 238 and around the centerline 214. The groove 240 is configured to receive the ring seal element 168 (see FIG. 1); e.g., the ring seal element 168 may be seated within the groove 240.

Figure 11:
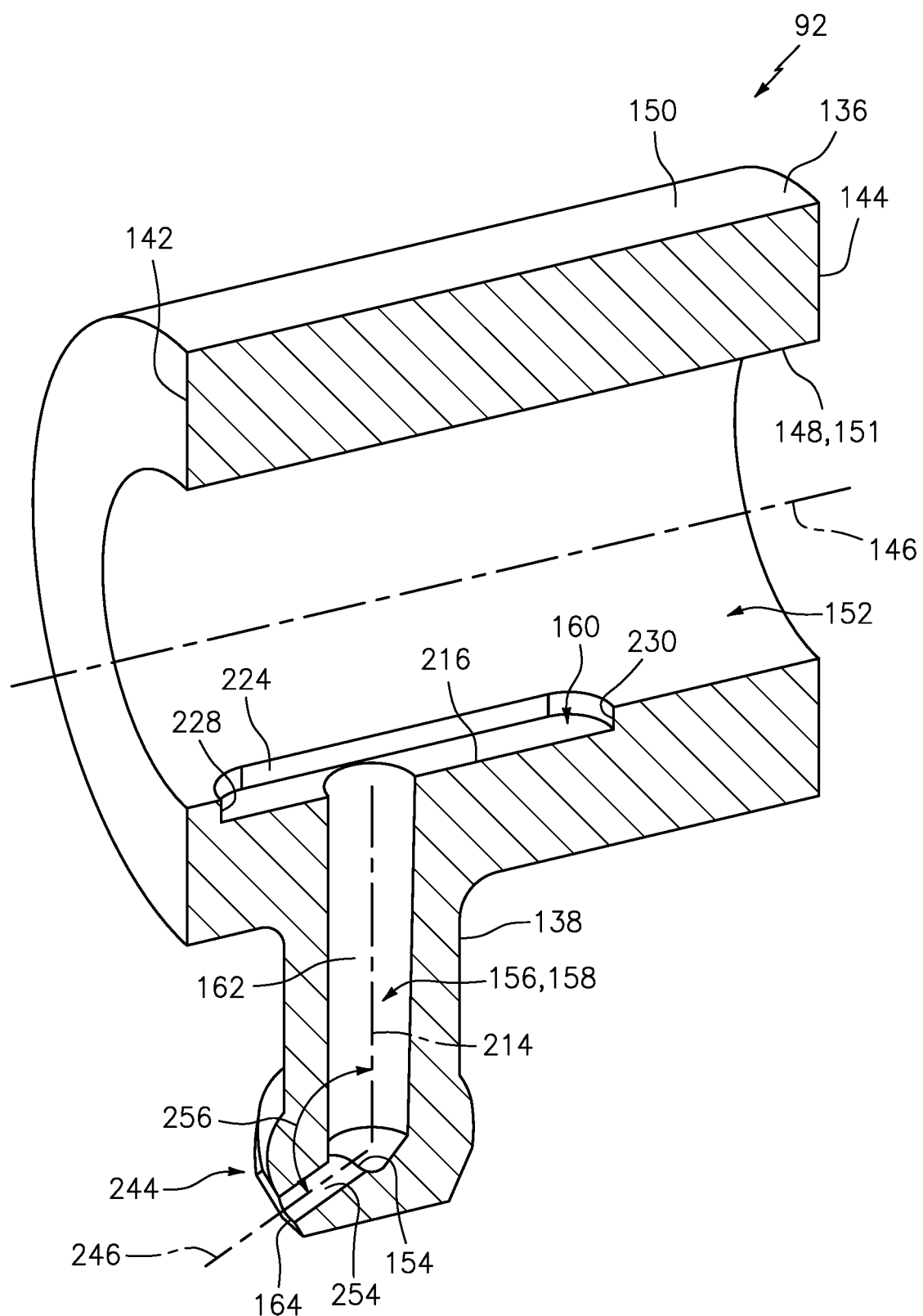
FIG. 11 is a perspective sectional illustration of another fluid delivery device configured with a nozzle.
Figure 12:
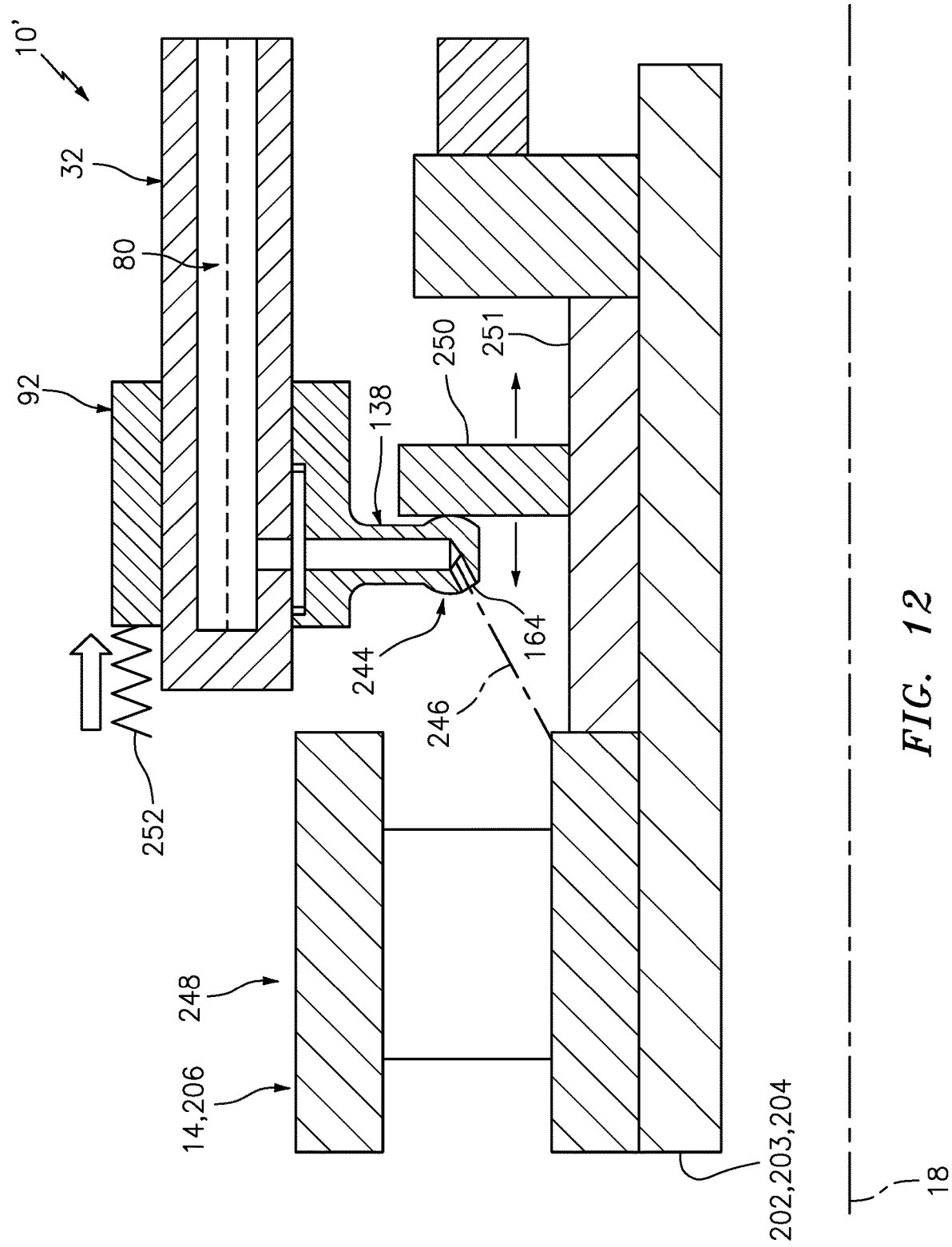
FIG. 12 is a schematic side sectional illustration of an assembly configured with the fluid delivery device of FIG. 11.

In some embodiments, referring to FIG. 11, the fluid delivery device 92 may be configured with a nozzle 244 where the outlet 164 is configured as a nozzle outlet. Referring to FIG. 12, this nozzle 244 is configured to direct fluid (e.g., lubricant, coolant, oil, etc.) received from a respective guide rail 32 through the outlet 164 along a trajectory 246 towards (e.g., to) another component 248. This other component 248 may be, for example, one of the bearings 14, 206 (see FIGS. 1 and 9), or any other component in the rotational equipment (e.g., the engine 178).

The tube 138 and its nozzle 244 of FIG. 12 is axially engaged with (e.g., contacting, abutted against, etc.) a sliding interface element 250. This sliding interface element 250 is configured to slide (e.g., translate) axially along another element; e.g., one of the shafts 202-204 or another component 251 mounted on one of the shafts 202-204. This assembly 10' may also include at least one spring element 252 for biasing the fluid delivery device 92 and its tube 138 against the element 250 and/or away from the component 248.

Referring to FIG. 11, in some embodiments, a centerline 254 of the nozzle outlet 164 may be angularly offset from the centerline 214 by an angle 256. This angle 256 may be an obtuse angle or an acute angle depending, for example, on the location of the component 248 relative to the fluid delivery device 92 (see FIG. 12).

In some embodiments, the sleeve 136 and the tube 138 may be configured together as a monolithic body. At least the sleeve 136 and the tube 138, for example, may be cast, machined, additively manufactured and/or otherwise formed from a single mass of material. The present disclosure, however, is not limited to any particular manufacturing techniques.

In some embodiments, the fluid delivery device 92 may be constructed from or otherwise include metal. The present disclosure, however, is not limited to such an exemplary fluid delivery device material.

In some embodiments, the fluid delivery device(s) 92 of FIGS. 8 and 11 may be configured with one or more seal elements and/or glands at the interface between the fluid delivery device 92 and the respective guide rail 32 (not shown in FIGS. 8 and 11). The fluid delivery device 92 of FIGS. 13 and 14, for example, includes ring seal elements 258 seated within annular recesses in the bore surface 151 of the sleeve 136. These seal elements 258 are arranged on opposing (e.g., axial) ends of the slot 160. With this arrangement, the seal elements 258 may provide additional sealing at the interface between the fluid delivery device 92 and the respective guide rail 32 (shown in dashed line form in FIG. 14). In other words, the seal elements 258 are (e.g., radially) engaged with and (e.g., radially) between the sleeve 136 and the respective guide rail 32. Of course, the bore surface 151 may still be configured with a tight tolerance clearance fit to the respective guide rail 32.

The assembly 10 may be included in various turbine engines other than the one described above as well as in other types of rotational equipment or non-rotational equipment. The assembly 10, for example, may be included in a geared turbine engine where a gear train connects one or more shafts to one or more rotors in a fan section, a compressor section and/or any other engine section. Alternatively, the assembly 10 may be included in a turbine engine configured without a gear train. The assembly 10 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A fluid delivery device, comprising:
a sleeve extending axially along an axis between a sleeve first end and a sleeve second end, the sleeve extending radially from a sleeve inner side to a sleeve outer side, the sleeve extending circumferentially around the axis thereby forming an internal bore at least partially formed by a bore surface at the sleeve inner side, and the internal bore extending axially along the axis through sleeve between the sleeve first end and the sleeve second end; and
a tube connected to the sleeve and projecting out from the sleeve outer side to a tube distal end, the tube configured with a delivery device fluid passage fluidly coupled with the internal bore, and the delivery device fluid passage extending radially through the tube to a fluid passage outlet at the tube distal end.

2. The fluid delivery device of claim 1, wherein a centerline of the delivery device fluid passage is perpendicular to the axis.

3. The fluid delivery device of claim 1, wherein a slot in the sleeve fluidly couples the internal bore to the delivery device fluid passage.

4. The fluid delivery device of claim 3, wherein
the slot extends partially radially into the sleeve from the sleeve inner side to a slot end;
the slot extends laterally within the sleeve between opposing slot lateral sides; and
the slot extends axially within the sleeve between opposing slot axial sides.

5. The fluid delivery device of claim 4, wherein a lateral width of the slot extending between the opposing slot lateral sides is less than an axial length of the slot extending between the opposing slot axial sides.

6. The fluid delivery device of claim 4, wherein a radial depth of the slot extending between the sleeve inner side and the slot end is less than one-third a radial thickness of the sleeve extending between the sleeve inner side and the sleeve outer side.

7. The fluid delivery device of claim 3, wherein the slot extends circumferentially around the axis.

8. The fluid delivery device of claim 1, wherein
an interface between the tube and the sleeve is located an axial first distance from the sleeve first end;
the interface between the tube and the sleeve is located an axial second distance from the sleeve second end; and
the axial first distance is different than the axial second distance.

9. The fluid delivery device of claim 1, wherein the tube is configured with a flared portion at the tube distal end.

10. The fluid delivery device of claim 9, wherein
the tube is configured with a groove in the flared portion; and
the groove extends within the flared portion around a centerline of the delivery device fluid passage.

11. The fluid delivery device of claim 10, further comprising a ring seal element seated within the groove.

12. The fluid delivery device of claim 1, wherein the tube comprises a nozzle, and the fluid passage outlet comprises a nozzle outlet.

13. An assembly for rotational equipment, comprising:
a guide rail comprising a guide rail fluid passage; and
a fluid delivery device including a sleeve and a tube;
the sleeve translatable axially along the guide rail where the guide rail projects axially through an internal bore of the sleeve; and
the tube connected to the sleeve and projecting out from an outer side of the sleeve to a tube distal end, the tube configured with a delivery device fluid passage fluidly coupled with the guide rail fluid passage, and the delivery device fluid passage extending radially through the sleeve and the tube to a fluid passage outlet at the tube distal end.

14. The assembly of claim 13, wherein
the guide rail fluid passage comprises a guide rail bore and a guide rail aperture fluidly coupled with the guide rail bore;
the guide rail bore extends partially axially along an axis into the guide rail;
the guide rail aperture extends radially into the guide rail to the guide rail bore; and
the delivery device fluid passage is fluidly coupled to the guide rail bore through the guide rail aperture.

15. The assembly of claim 13, wherein
the delivery device fluid passage comprises a tube bore and a slot;
the tube bore extending radially from the slot to the fluid passage outlet; and
the slot extends radially into an inner side of the sleeve, and the slot fluidly couples the guide rail fluid passage to the tube bore.

16. The assembly of claim 13, wherein an inner side of the sleeve radially engages and is axially slidable along an outer side of the guide rail at a tight tolerance clearance fit between the sleeve and the guide rail.

17. The assembly of claim 13, further comprising one or more seal elements sealingly engaged with and between the sleeve and the guide rail.

18. The assembly of claim 13, further comprising a component comprising a receptacle configured to receive the tube at the tube distal end, and the component mated with and configured to translate axially along the guide rail.

19. The assembly of claim 13, further comprising:
a component;
the tube comprising a nozzle configured to direct fluid from the fluid passage outlet to impinge against the component.

20. A fluid delivery device, comprising:
a tubular body extending radially from a cylindrical surface at an inner side of the tubular body to an outer side of the tubular body, the cylindrical surface forming a bore within the tubular body, the bore extending axially along an axis through the tubular body, and the tubular body comprising a slot that extends radially into the tubular body from the cylindrical surface; and a tube projecting out from the tubular body to a tube distal end, the tube configured with a delivery device fluid passage fluidly coupled to the bore through the slot, and the delivery device fluid passage extending through the tube to a fluid passage outlet at the tube distal end.

\* \* \* \* \*